US010330840B2

(12) United States Patent
Yoon et al.

(10) Patent No.: US 10,330,840 B2
(45) Date of Patent: Jun. 25, 2019

(54) OPTICAL FILM

(71) Applicant: LG Chem, Ltd., Seoul (KR)

(72) Inventors: Jeong Ae Yoon, Daejeon (KR); Su Jeong Kim, Daejeon (KR); Sung Soo Yoon, Daejeon (KR); Min Ki Lee, Daejeon (KR); Sang Hyun Hong, Daejeon (KR)

(73) Assignee: LG Chem, Ltd. (KR)

( * ) Notice: Subject to any disclaimer, the term of this patent is extended or adjusted under 35 U.S.C. 154(b) by 239 days.

(21) Appl. No.: 15/024,788

(22) PCT Filed: Dec. 18, 2014

(86) PCT No.: PCT/KR2014/012540
§ 371 (c)(1),
(2) Date: Mar. 24, 2016

(87) PCT Pub. No.: WO2015/093874
PCT Pub. Date: Jun. 25, 2015

(65) Prior Publication Data
US 2016/0280966 A1  Sep. 29, 2016

(30) Foreign Application Priority Data

Dec. 20, 2013 (KR) .................. 10-2013-0159846
Dec. 18, 2014 (KR) .................. 10-2014-0183050

(51) Int. Cl.
| | | |
|---|---|---|
| G02B 5/30 | (2006.01) | |
| G02F 1/1335 | (2006.01) | |
| C08F 293/00 | (2006.01) | |
| C08F 297/00 | (2006.01) | |
| C09J 153/00 | (2006.01) | |
| C09J 7/38 | (2018.01) | |
| C09J 7/22 | (2018.01) | |

(52) U.S. Cl.
CPC .......... *G02B 5/305* (2013.01); *C08F 293/005* (2013.01); *C08F 297/00* (2013.01); *C09J 7/22* (2018.01); *C09J 7/38* (2018.01); *C09J 153/00* (2013.01); *C09J 2201/122* (2013.01); *C09J 2201/622* (2013.01); *C09J 2203/318* (2013.01); *C09J 2433/00* (2013.01); *C09J 2453/00* (2013.01); *G02F 1/133528* (2013.01); *G02F 2202/28* (2013.01)

(58) Field of Classification Search
CPC ... C08F 393/005; C08F 297/00; C09J 153/00; C09J 2433/00; C09J 2203/318; C09J 2453/00; G02B 5/305
See application file for complete search history.

(56) References Cited

U.S. PATENT DOCUMENTS

| | | | | |
|---|---|---|---|---|
| 4,119,615 A | * | 10/1978 | Schulze | ................ C08G 69/40 428/474.4 |
| 6,197,883 B1 | | 3/2001 | Schimmel et al. | |
| 6,288,173 B1 | | 9/2001 | Schimmel et al. | |
| 2005/0090592 A1 | | 4/2005 | Husemann et al. | |
| 2006/0024521 A1 | | 2/2006 | Everaerts et al. | |
| 2007/0177273 A1 | | 8/2007 | Benson et al. | |
| 2008/0011419 A1 | | 1/2008 | Everaerts et al. | |
| 2009/0186067 A1 | * | 7/2009 | Strickler | ................ A61L 27/16 424/423 |
| 2010/0256299 A1 | * | 10/2010 | Nabuurs | ............... C08F 293/00 524/832 |
| 2012/0308777 A1 | * | 12/2012 | Davis | .................... C08L 79/08 428/156 |
| 2015/0069711 A1 | * | 3/2015 | Johnson | .................. C08L 81/00 277/300 |
| 2015/0079387 A1 | | 3/2015 | Yang et al. | |
| 2015/0307659 A1 | * | 10/2015 | Hong | .................... C08G 61/10 429/492 |
| 2016/0159987 A1 | * | 6/2016 | Sherman | ................ C08G 69/42 525/431 |

FOREIGN PATENT DOCUMENTS

| | | |
|---|---|---|
| CN | 1989216 A | 6/2007 |
| CN | 101346649 A | 1/2009 |
| JP | 2002173573 A | 6/2002 |
| JP | 2004505166 A | 2/2004 |
| JP | 2011052131 A | 3/2011 |
| JP | 201382772 A | 5/2013 |
| KR | 10-1023839 B1 | 3/2011 |
| KR | 10-1171976 B1 | 8/2012 |
| KR | 10-1171977 B1 | 8/2012 |
| KR | 20130101783 A | 9/2013 |
| KR | 20130129856 A | 11/2013 |
| WO | 2008100719 A1 | 8/2008 |

OTHER PUBLICATIONS

Koutalas et al., Novel Block—Comb/Graft Copolymers with the Macromonomer Strategy and Anionic Polymerization, Journal of Polymer Science: Part A: Polymer Chemistry, vol. 43, 4040-4049 (2005).*
Chinese Search Report for Application No. CN201480061161.X dated Sep. 30, 2017.
International Search Report from PCT/KR2014/012540, dated Mar. 10, 2015.
Extended European Search Report for Application No. EP14871414 dated Aug. 7, 2017.

* cited by examiner

*Primary Examiner* — Jeffrey C Mullis
(74) *Attorney, Agent, or Firm* — Lerner, David, Littenberg, Krumholz & Mentlik, LLP

(57) ABSTRACT

Provided are a pressure-sensitive adhesive optical film, a crosslinkable composition, and a display device. A pressure-sensitive adhesive layer using a polymer component exhibiting excellent crosslinking efficiency even at a low molecular weight to exhibit excellent workability, durability and dimension stability, and the optical film to which such a pressure-sensitive adhesive layer is applied may be provided.

20 Claims, No Drawings

OPTICAL FILM

TECHNICAL FIELD

The present application relates to a pressure-sensitive adhesive optical film, a crosslinkable composition, and a display device.

BACKGROUND

A polymer composition realizing a crosslinking structure is being used in various industrial fields. A representative polymer composition realizing a crosslinking structure may be used to form a pressure-sensitive adhesive. For example, a pressure-sensitive adhesive may be used to attach a polarizing plate or an optical film such as a retardation film to a display device such as liquid crystal display device (LCD device) or to laminate a polarizing plate or an optical film such as a retardation film. For example, in patent documents 1 to 3, as a pressure-sensitive adhesive composition, a polymer composition capable of realizing a crosslinking structure is disclosed.

PRIOR ART DOCUMENTS

Patent Documents (Patent Document 1) Patent Document 1: Korean Patent No. 1023839

(PATENT DOCUMENT 3) PATENT DOCUMENT 2: Korean Patent No. 1171976

(Patent Document 3) Patent Document 3: Korean Patent No. 1171977

DESCRIPTION

Technical Object

The present application is directed to providing a pressure-sensitive adhesive optical film, a crosslinkable composition and a display device.

Solution

In one aspect, the present application provides a pressure-sensitive adhesive optical film. The term "pressure-sensitive adhesive optical film" used herein may refer to an optical film in which a pressure-sensitive adhesive layer is formed on at least one surface of an optical member to laminate the optical member with another optical member by means of the pressure-sensitive adhesive layer, or attach the optical member to an optical device such as a display panel.

Accordingly, the exemplary optical film may include an optical member; and a pressure-sensitive adhesive layer formed on one or both surfaces of the optical member. Here, the pressure-sensitive adhesive layer may be provided to attach the optical member to an optical device such as a liquid crystal panel of an LCD device or another optical member.

A type of the optical member included in the optical film is not particularly limited, and various optical members which can perform an optional optical function may be included. The optical member may be a film or sheet type. A representative optical member may be, but is not limited to, a polarizer, a polarizing plate, a brightness-enhancing film, a viewing angle compensation film, an antireflection film or an optical lens.

The terms "polarizer and polarizing plate" used herein are distinguished from each other. The term "polarizer" may mean a member having a polarizing function such as a polyvinyl alcohol-based polarizer which will be described below, and the term "polarizing plate" used herein may mean an optical member formed in a laminate including another layer is present on one or both surfaces of the polarizer.

As the optical member which can be included in the optical film, a polarizer may be used. When the optical member is a polarizer, the optical film may be a polarizing plate. A type of the polarizer included in the polarizing plate is not particularly limited, and for example, a general type known in the art such as a polyvinyl alcohol-based polarizer may be employed without limitation.

The polarizer is a functional film capable of extracting only light oscillating in one direction from light oscillating and incident in various directions. Such a polarizer may be formed in a structure in which a dichroic pigment is adsorbed to a polyvinyl alcohol-based resin film. The polyvinyl alcohol-based resin film constituting the polarizer may be obtained by gelating, for example, a polyvinyl acetate-based resin. In the poylvinyl acetate-based resin, as well as a homopolymer of vinyl acetate, a copolymer of vinyl acetate and another monomer which can be copolymerized with the vinyl acetate may be included. As an example of a monomer copolymerized with vinyl acetate, one or a mixture of at least two of unsaturated carbonic acids, olefins, vinylethers, unsaturated sulfonic acids and acrylamides having an ammonium group may be used, but the present application is not limited thereto. A degree of gelation of the polyvinyl alcohol-based resin may generally be approximately 85 to 100 mol % or 98 mol %. The polyvinyl alcohol-based resin may be further modified, and for example, polyvinyl formal or polyvinyl acetal modified with an aldehyde may also be used. In addition, a degree of polymerization of the polyvinyl alcohol-based resin may generally be approximately 1,000 to 10,000 or 1,500 to 5,000.

The polarizer may be formed by a process of uniaxially stretching the polyvinyl alcohol-based resin film, a process of dying the polyvinyl alcohol-based resin film with a dichroic pigment, and adsorbing the dichroic dye, a process of treating the polyvinyl alcohol-based resin film to which the dichroic pigment is adsorbed with a boric acid aqueous solution, and a process of treating the polyvinyl alcohol-based resin film with a boric acid aqueous solution and performing a wash. Here, as the dichroic pigment, iodine or a dichroic organic dye may be used.

The optical film may further include a protective film attached to one or both surfaces of the polarizer, and in this case, the pressure-sensitive adhesive layer may be formed on one surface of the protective film. A type of the protective film may be, but is not particularly limited to, for example, one or a laminate of at least two of a cellulose-based film such as triacetyl cellulose (TAC); a polyester-based film such as a polycarbonate film or poly(ethylene terephthalate) (PET); a polyethersulfone-based film or a polyethylene film; a polypropylene film or a polyolefin-based film manufactured using a resin having a cyclo-based or norbornene structure or an ethylene-propylene copolymer; and a polyacrylate-based film.

The optical film may further include at least one functional layer selected from the group consisting of a protective layer, a reflective layer, an anti-glare layer, a retardation plate, a wide viewing angle compensation film and a brightness-enhancing film.

The optical film may include a pressure-sensitive adhesive layer formed on at least one surface of the optical member. The pressure-sensitive adhesive layer may include a crosslinked product having a crosslinkable composition. The pressure-sensitive adhesive layer may include the crosslinked product having the crosslinkable composition as a main component. The phrase "an object includes a certain component as a main component" used herein may mean a ratio of the component in the object is 50, 60, 70, 80, 90 or 95% or more based on a weight.

The term "crosslinkable composition" used herein may be a composition including a component capable of realizing a crosslinkable structure by a chemical or physical method. The crosslinkable composition may be a polymer composition capable of forming, for example, a pressure-sensitive adhesive composition. The crosslinkable composition may include a block copolymer. The term "block copolymer" used herein may refer to a polymer in which at least two polymer blocks having different chemical components are connected by one end of a chain using a covalent bond.

The block copolymer may include a first block having a predetermined glass transition temperature and a second block having a lower glass transition temperature than the first block. The term "glass transition temperature of a specific block" of the block copolymer may be a glass transition temperature measured from a polymer formed only of monomers included in the block or a theoretical value calculated in consideration of the monomers. Here, the theoretical value of the glass transition temperature is a value calculated by the Fox equation.

The glass transition temperature of the first block of the block copolymer may be 30, 40, 50, 60, 70 or 80° C. or more. The upper limit of the glass transition temperature of the first block is not particularly limited, and may be determined to be, for example, 250, 230, 200, 180 or 150° C. or less.

The glass transition temperature of the second block of the block copolymer may be 0, −10, −20 or −30° C. or less. The lower limit of the glass transition temperature of the second block is not particularly limited, and may be, for example, −80, −75, −70, −65, or −60° C. or more.

As the glass transition temperatures of the first block and the second block may be adjusted in the range, suitable pressure-sensitive adhesive reliability of the pressure-sensitive adhesive layer is ensured, and other required physical properties such as reworkability or cuttability may be effectively maintained.

The first block may be included in the block copolymer at a number average molecular weight (Mn) of, for example, 2,500, 5,000, 7,000, 10,000 or 12,000 or more. The number average molecular weight may also be, for example, 150,000, 100,000, 50,000, 30,000, or 25,000 or less. The number average molecular weight of the first block may mean a number average molecular weight of a polymer prepared by polymerizing only monomers forming the first block. The term "number average molecular weight" used herein may be measured by a method disclosed in the examples, for example, using gel permeation chromatography (GPC). The block copolymer may have a number average molecular weight in the range of 5,000 to 500,000. In another example, the number average molecular weight of the block copolymer may be 5,500, 6,000, 6,500, 7,000, 8,000, 9,000, or 10,000 or more. The upper limit of the number average molecular weight of the block copolymer may generally be, but is not particularly limited to, 400,000, 350,000, 300,000, 250,000, 200,000, or 150,000 or less. According to such a molecular weight characteristic, the block copolymer may exhibit a suitable self-assembly characteristic or a phase separation characteristic.

A polydispersity index (PDI; Mw/Mn) of the block copolymer, that is, a ratio (Mw/Mn) of a weight average molecular weight (Mw) and a number average molecular weight (Mn) may be, for example, 1.5 or more, 2.0 or more, 2.5 or more, or 3.0 or more. The upper limit of the number average molecular weight of the block copolymer may be, but is not limited to, for example, 10, 9, 8, or 7 or less. According to the PDI in this range, a desired physical property, for example, a pressure-sensitive adhesive property of the crosslinkable composition may be suitably exhibited.

The block copolymer may be a crosslinkable copolymer having a crosslinkable functional group. As the crosslinkable functional group, a hydroxyl group, a carboxyl group, an isocyanate group, a glycidyl group, an amine group, an alkoxysilyl group or a vinyl group may be used, and generally, a hydroxyl group or a carboxyl group may be used. The crosslinkable functional group may be present in any one of the first and second blocks, but it is preferable that, to realize a suitable crosslinking structure, the crosslinkable functional group is present in the second block having a relatively low glass transition temperature. For example, the block copolymer may have a structure in which the second block includes at least a crosslinkable functional group, and the first block includes or does not includes a crosslinkable functional group. When the second block includes a crosslinkable functional group, as the first block serves as a physical crosslinking point and the second block serves as a chemical crosslinking point, a desired crosslinking structure may be more effectively realized.

The block copolymer may have a branched structure including the first or second block having a branched structure. Although not particularly limited, the second block of the first and second blocks may be formed in a branched structure. Such a block copolymer may have a structure including a diblock copolymer having a type of the first block-the second block or a triblock or more blocks forming a copolymer having a type of the first block-the second block-the first block or the second block-the first block-the second block, and may further include an additional block in addition to the first block or the second block.

A type of a monomer forming the first block or the second block is not particularly limited, as long as it ensures the above range of a glass transition temperature due to the above combination, has a branched structure in a necessary block, and includes a crosslinkable functional group.

In one example, the first block may include a polymerization unit of a (meth)acrylic acid ester monomer. In the specification, the term "monomer" includes all types of compounds which can form a polymer by polymerization, and may also include an oligomer-type compound formed by polymerizing a unimolecular monomer or at least two monomers. In addition, the term "polymerization unit of a monomer" may refer to a main chain or side chain of the monomer that is polymerized to form a backbone of a polymer or block, In addition, unless particularly defined otherwise, the phrase that the monomer is included in a block or copolymer may mean that the monomer is included in a form of the polymerization unit.

As the (meth)acrylic acid ester monomer, for example, an alkyl (meth)acrylate may be used. In consideration of controlling a cohesive strength, a glass transition temperature and a pressure-sensitive adhesive property, an alkyl (meth)acrylate having an alkyl group having 1 to 20, 1 to 16, 1 to 12, 1 to 8 or 1 to 4 carbon atoms may be used. Here, the alkyl group may be, for example, a linear, branched or cyclic type. Such a monomer may be methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isobornyl(meth)acrylate, isooctyl(meth)acrylate, isononyl(meth)acrylate, and lauryl(meth)acrylate, which may be used alone or in combination of at least two thereof to ensure the glass transition temperature. Although not particularly limited, in consideration of easy control of the glass transition temperature, among the monomers, a methacrylic acid ester monomer such as an alkyl methacrylate having an alkyl group having 1 to 20, 1 to 16, 1 to 12, 1 to 8 or 1 to 4 carbon atoms may be used. The alkyl methacrylate may be included in the first block as a main component. That is, the alkyl methacrylate may be included at 50, 60, 70, 80, 90, or 95 wt % based on a total weight of the first block.

The second block may also include a polymerization unit derived from a (meth)acrylic acid ester monomer. As the (meth)acrylic acid ester monomer, a suitable type may be selected from the types described for the first block in consideration of a desired glass transition temperature. In consideration of easy control of the glass transition temperature, as the (meth)acrylic acid ester monomer for forming the second block, among the above-described monomers, an acrylic acid ester monomer such as an alkyl acrylate, for example, having an alkyl group having 1 to 20, 1 to 16, 1 to 12, 1 to 8 or 1 to 4 carbon atoms may be used. The alkyl acrylate may be included in the second block as a main component. That is, the alkyl acrylate may be included at 50, 60, 70, 80, 90, or 95 wt % or more with respect to a total weight of the second block.

One of the first and second blocks, which has a branched structure, may further include a polymerization unit of a branch-forming monomer. Accordingly, the block having the branched structure may include a polymerization unit of a (meth)acrylic acid ester monomer and a polymerization unit of the branch-forming monomer. When the block having the branched structure is the first block, the (meth)acrylic acid ester monomer may be the above-described alkyl methacrylate, and when the block having the branched structure is the second block, the (meth)acrylic acid ester monomer may be the above-described alkyl acrylate.

As the branch-forming monomer, for example, a monomer having at least two polymerizable functional groups and/or polymerization initiating functional groups may be used. That is, the monomer may include at least two of any one type selected from the polymerizable functional group and the polymerization initiating functional group, or may include at least one polymerizable functional group and at least one polymerization initiating functional group. Here, the polymerizable functional group may mean a functional group which can be copolymerized with another monomer forming a block along with the (meth)acrylic acid ester monomer, and the polymerization initiating functional group may mean a functional group which can be polymerized from the polymerizable functional group.

As such a polymerizable functional group or polymerization initiating functional group, an alkenyl group, an acryloyloxy group, a methacryloyloxy group, an acryloyloxy group, an alkyl group, a methacryloyloxy group, alkyl group or a haloalkyl group may be used, but the present application is not limited thereto. That is, the polymerizable functional group or polymerization initiating functional group described herein is usually applied to radical polymerization or atom-transfer radical-polymerization (ATRP), and other than this, all polymerizable functional groups or polymerization initiating functional groups known to be applied in radical polymerization or ATRP may be used. When a different polymerization method is applied, a polymerizable functional group or polymerization initiating functional group may be applied to be adjusted to the selected polymerization method.

The term "alkyl group" used herein may be, unless particularly defined otherwise, a linear, branched or cyclic alkyl group having 1 to 20, 1 to 16, 1 to 12, 1 to 8 or 1 to 4 carbon atoms. The alkyl group may be optionally substituted with at least one substituent.

The term "alkenyl group" used herein may be, unless specifically defined otherwise, a linear, branched or cyclic alkenyl group having 2 to 20, 2 to 16, 2 to 12, 2 to 8 or 2 to 4 carbon atoms. The alkenyl group may be optionally substituted with at least one substituent.

In addition, a halogen atom present in the haloalkyl group may be chlorine or fluorine, but the present application is not limited thereto.

As the branch-forming monomer, for example, a compound of Formula 1 may be used.

 [Formula 1]

In Formula 1, Y is an alkenyl group, an acryloyloxy group, a methacryloyloxy group, an acryloyloxyalkyl group, a methacryloyloxyalkyl group or a haloalkyl group, X is an n valent residue derived from a hydrocarbon group including or not including an oxygen atom, and n is a number in the range of 2 to 6.

The term "hydrocarbon group" used herein may be a compound composed of carbon and hydrogen or a derivative thereof. In the definition of Formula 1, the hydrocarbon group may include an oxygen atom. As the hydrocarbon group of Formula 1, for example, an alkane having 1 to 20, 1 to 16, 1 to 12, 1 to 8 or 1 to 4 carbon atoms, an alkene or alkyne having 2 to 20, 2 to 16, 2 to 12, 2 to 8 or 2 to 4 carbon atoms, or an aromatic compound having 6 to 24, 6 to 18 or 6 to 12 carbon atoms may be used. In addition, a structure in which at least one of the carbon atoms forming the alkane, alkene or alkyne is replaced with an oxygen atom, and a structure in which an ester group or an ether group is included in the alkane, alkene or alkyne may be included in the category of the hydrocarbon group of Formula 1.

In addition, the term "n valent residue derived from a hydrocarbon group" may be a residue derived from the above-described hydrocarbon group, which is bonded to an n number of Y groups in Formula 1.

As the branch-forming monomer, for example, a compound represented by at least one of the compounds of Formulas 2 to 5 may be used.

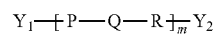 [Formula 2]

In Formula 2, $Y_1$ and $Y_2$ are each independently an alkenyl group, an acryloyloxy group, a methacryloyloxy group, an acryloyloxyalkyl group, a methacryloyloxyalkyl group or a haloalkyl group, P and R are each independently an alkylene group or a single bond, Q is an oxygen atom or a single bond, and m is a number in the range of 1 to 10.

[Formula 3]

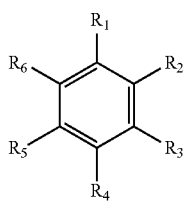

In Formula 3, $R_1$ to $R_6$ are each independently a hydrogen atom, an alkyl group, an alkenyl group, an acryloyloxy group, a methacryloyloxy group, an acryloyloxyalkyl group, a methacryloyloxyalkyl group or a haloalkyl group, and at least two of $R_1$ to $R_6$ are an alkenyl group, an acryloyloxy group, a methacryloyloxy group, an acryloyloxyalkyl group, a methacryloyloxyalkyl group or a haloalkyl group.

[Formula 4]

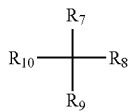

In Formula 4, $R_7$ and $R_{10}$ are each independently a hydrogen atom, an alkyl group, an alkenyl group, an acryloyloxy group, a methacryloyloxy group, an acryloyloxyalkyl group, a methacryloyloxyalkyl group or a haloalkyl group, and at least three of $R_7$ to $R_{10}$ are alkenyl groups, acryloyloxy groups, methacryloyloxy groups, acryloyloxyalkyl groups, methacryloyloxyalkyl groups or haloalkyl groups.

[Formula 5]

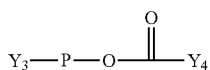

In Formula 5, $Y_3$ and $Y_4$ are each independently an alkenyl group, an acryloyloxy group, a methacryloyloxy group, an acryloyloxyalkyl group, a methacryloyloxyalkyl group or a haloalkyl group, and P is an alkylene group.

In the definition of Formula 2, the term "single bond" means the case in which a separate atom is not present in a corresponding site. For example, in Formula 2, when R is a single bond, Q may be directly linked to $Y_2$.

The term "alkylene group" used herein may be, unless specifically defined otherwise, a linear, branched or cyclic alkylene group having 1 to 20, 1 to 16, 1 to 12, 1 to 8 or 1 to 4 carbon atoms. The alkylene group may be optionally substituted with at least one substituent.

In Formula 2, $Y_1$ and $Y_2$ may be, in another example, an acryloyloxy group or a methacryloyloxy group. In Formula 2, P may be an alkylene group, and R may be a single bond or an alkylene group. As such a compound, a multifunctional acrylate such as ethyleneglycol di(meth)acrylate, diethyleneglycol di(meth)acrylate or hexamethyleneglycol di(meth)acrylate may be used, but the present application is not limited thereto.

In another example of Formula 3, $R_1$ to $R_6$ are each independently a hydrogen atom, an alkyl group, an alkenyl group or a haloalkyl group, at least two of $R_1$ to $R_6$ may be an alkenyl group or a haloalkyl group. As such a compound, a multifunctional vinyl compound such as divinyl benzene, or an inimer for atom-transfer radical-polymerization (ATRP) such as 4-chloroalkyl styrene may be used.

In another example of Formula 4, $R_7$ and $R_{10}$ may be each independently a hydrogen atom, an alkyl group, an acryloyloxyalkyl group or a methacryloyloxyalkyl group, and at least three of $R_7$ to $R_{10}$ may be an acryloyloxyalkyl group or a methacryloyloxyalkyl group. As such a compound, a multifunctional acrylate such as trimethylolpropane tri(meth)acrylate may be used.

In another example of Formula 5, $Y_3$ may be an acryloyloxy group, a methacryloyloxy group, an acryloyloxyalkyl group or a methacryloyloxyalkyl group, and $Y_4$ may be a haloalkyl group. As such a compound, (meth)acryloyloxyalkyl alpha-bromoisobutyrate or an inimer for ATRP such as 4-chloroalkyl styrene may be used, but the present application is not limited thereto.

Various monomers having a structure which can realize a branched structure are known in the art, and other than the above-described monomers, any monomer that can realize a branched structure may be applied to the present application.

When the branch-forming monomer is included, it may be appropriate that a ratio of the number of moles of the monomer may be, but is not particularly limited to, for example, approximately 0.01 to 10 mol % with respect to the total number of moles of the monomers forming a corresponding block. In the above-described range, a suitable amount of branched structures may be realized, and processability may also be ensured.

In one of the first block and second block including a crosslinkable functional group, a polymerization unit of a copolymerizable monomer (hereinafter, simply referred to as a crosslinkable monomer) having a crosslinkable functional group along with a polymerization unit of the monomer, that is, a (meth)acrylic acid alkyl ester monomer may be included. In the specification, the copolymerizable monomer having a crosslinkable functional group may include all types of monomers having a site copolymerizable with another monomer included in the block copolymer such as the (meth)acrylic acid ester monomer, and achieving a desired glass transition temperature in each block with the compound having the above-described crosslinkable functional group.

When the crosslinkable functional group is included in the second block, the (meth)acrylic acid ester monomer may be the above-described alkyl acrylate, and when the crosslinkable functional group is in the first block, the (meth)acrylic acid ester monomer may be the above-described alkyl methacrylate.

Various monomers having the above described crosslinkable functional group and the copolymerizable site are known in the art, and the monomer may be used in all types of the polymers. For example, as a copolymerizable monomer having a hydroxyl group, a hydroxyalkyl(meth)acrylate such as 2-hydroxyethyl (meth)acrylate, 2-hydroxypropyl (meth)acrylate, 4-hydroxybutyl(meth)acrylate, 6-hydroxyhexyl(meth)acrylate or 8-hydroxyoctyl(meth)acrylate, or glycerol mono(meth)acrylate, or a hydroxyl-terminated poly(alkyleneglycol) such as (meth)acrylate poly(ethylene glycol) (meth)acrylate or poly(propylene glycol) (meth)acrylate may be used, but the present application is not limited thereto. As an additional example of the crosslinkable monomer, a (latent)carboxylic acid-containing compound such as (meth)acrylic acid, an epoxy group-containing compound such as anhydride maleic acid, glycidyl(meth)acrylate, epoxy cyclohexylmethyl(meth)acrylate, an isocyanate group-containing compound such as 2-isocyanatoethyl (meth)acrylate, an amine group-containing compound such as 2-aminoethyl(meth)acrylate, or a silyl group-containing compound such as 3-(trimethoxy)silylpropyl (meth)acrylatemay be used, but the present application is not limited thereto. In consideration of reactivity with another monomer for forming a block, ease of polymerization, or easy selection of a crosslinking agent, among the above-described monomers, for example, a hydroxyl group-containing compound such as hydroxyalkyl acrylate or hydroxyalkyleneglycol acrylate may be used, but the present application is not limited thereto.

When the crosslinkable monomer is included, a ratio is not particularly limited, and for example, it may be appropriate that a ratio of the number of moles of the crosslinkable monomer is approximately 0.3 to 20, 0.3 to 15, 0.3 to 10 or 0.3 to 5 mol % based on the total number of moles of the monomer forming a corresponding block.

When it is necessary, for example, to adjust the glass transition temperature, the first block and/or second block may further include any comonomer, and the monomer may be included as a polymerization unit. The comonomer may be, but is not limited to, a nitrogen-containing monomer such as (meth)acrylonitrile, (meth)acrylamide, N-methyl (meth)acrylamide, N-butoxymethyl(meth)acrylamide, N-vinyl pyrrolidone or N-vinyl caprolactam; an alkylene oxide-containing monomer such as an alkoxy alkyleneglycol (meth)acrylic acid ester, an alkoxy dialkyleneglycol(meth) acrylic acid ester, an alkoxy trialkyleneglycol(meth)acrylic acid ester, an alkoxy tetraalkyleneglycol(meth)acrylic acid ester, an alkoxy polyethyleneglycol(meth)acrylic acid ester, a phenoxy alkyleneglycol(meth)acrylic acid ester, a phenoxy dialkyleneglycol(meth)acrylic acid ester, a phenoxy trialkyleneglycol(meth)acrylic acid ester, a phenoxy tetraalkyleneglycol(meth)acrylic acid ester or a phenoxy polyalkyleneglycol(meth)acrylic acid ester; a styrene-based monomer such as styrene or methyl styrene; or a carboxyl acid vinyl ester such as vinyl acetate. One or at least two suitable types of the comonomers may be included in the polymer. Such a comonomer may be included in a block copolymer in a ratio of, for example, 20 parts by weight or less, or 0.1 to 15 parts by weight with respect to a total weight of other monomers used in respective blocks as polymerization units.

The block copolymer may be phase-separated in the pressure-sensitive adhesive layer to realize a self-assembly structure such as a sphere, a cylinder, a gyroid or a lamellar. The block copolymer in the pressure-sensitive adhesive layer may realize any one of the above structures, or a structure in which at least two structures are combined may be realized. A suitable crosslinking degree may be ensured by realizing a suitable phase separation structure, and thus an excellent physical property such as pressure-sensitive adhesive reliability or reworkability may be realized.

The block copolymer may include, for example, 5 to 25 parts by weight of the first block and 75 to 95 parts by weight of the second block. In one example, by adjusting a weight ratio between the first block and the second block of the block copolymer, physical properties including pressure-sensitive reliability, reworkability and cuttability of the pressure-sensitive adhesive layer including the block copolymer may be adjusted. In addition, the ratio between the blocks may also influence a phase-separated structure realized by the block copolymer. For example, in the above-described range, as the weight of the first block increases, it tends to realize a structure formed of a sphere, a cylinder, a gyroid, and a lamella, sequentially. A type of a phase of the block copolymer realized in the pressure-sensitive adhesive layer may be adjusted by adjusting a weight ratio according to a purpose, but the present application is not particularly limited thereto. However, a sphere phase or a cylinder phase among the phases may be suitable to serve as a physical crosslinking point of the hard first block at room temperature and enhance required physical properties such as a pressure-sensitive adhesive property and a physical crosslinking property, and the sphere phase is preferably used. In another example, the block copolymer may include 5 to 20 parts by weight of the first block and 80 to 95 parts by weight of the second block, or 7 to 17 parts by weight of the first block and 83 to 93 parts by weight of the second block. Unless particularly defined otherwise, the unit "parts by weight" used herein may be a weight ratio between components.

A method of manufacturing a block copolymer is not particularly limited, and may be a conventional method. The block polymer may be polymerized by, for example, living radical polymerization (LRP), which may be specifically, activators regenerated by electron transfer (ARGET) ATRP or initiators for continuous activator regeneration (ICAR) ATRP to perform polymerization using an atomic transfer radical polymerizer as a polymerization controller in the presence of an organic or inorganic reducing agent generating electrons, reversible addition-fragmentation chain transfer (RAFT) polymerization using an RAFT agent or a method using an organic tellurium compound as an initiator, and a suitable method selected from the above methods may be applied. To form a branched structure, for example, a reaction is terminated at the time that a conversion rate of a monomer of any one block is in a predetermined range of, for example, approximately 60 to 100%, and a reaction may be performed adding the branch-forming monomer and other monomers using the block as a macro initiator.

The crosslinkable composition may further include a crosslinking agent which can crosslink a block copolymer. As the crosslinking agent, a compound having at least 2, for example, 2 to 10, 2 to 8, 2 to 6 or 2 to 4 functional groups which can be reacted with the above-described crosslinkable functional group may be used, and various types of such compounds are known. For example, as the crosslinking agent, an isocyanate crosslinking agent, an epoxy crosslinking agent, an aziridine crosslinking agent or a metal chelate crosslinking agent may be used, for example, an isocyanate crosslinking agent may be used.

As an isocyanate crosslinking agent, for example, a diisocyanate compound such as tolyene diisocyanate, xylene diisocyanate, diphenylmethane diisocyanate, hexamethylene diisocyanate, isoboron diisocyanate, tetramethylxylene diisocyanate or naphthyl diisocyanate, or a compound prepared by a reaction of the diisocyanate compound with a polyol may be used, and here, the polyol may be, for example, trimethylol propane.

In the crosslinkable composition, one or at least two of the crosslinking agents may be used, but the present application is not limited thereto.

The multifunctional crosslinking agent may be included in the crosslinkable composition, for example, at 0.01 to 10 or 0.01 to 5 parts by weight with respect to 100 parts by weight of the block copolymer, and in this range, a gel content, a cohesive strength, a crosslinking property, a pressure-sensitive adhesive strength and durability of a crosslinked product may be excellently maintained.

The crosslinkable composition may further include a silane coupling agent. As the silane coupling agent, for example, a silane coupling agent having an isocyanate group, a thiol group, a (meth)acryloyloxy group, an amino group, a vinyl group, an expoy group, a beta-cyano group or an acetoacetyl group may be used. Such a silane coupling agent may allow, for example, a crosslinked product formed of a copolymer having a low molecular weight to exhibit excellent cohesive property and pressure-sensitive adhesive stability, and to maintain excellent durability and reliability under heat resistant and moisture and heat resistant conditions. As the silane coupling agent, a product name KBM-403, KBE-403, KBM-503, KBM-5103, KBM-903, KBM-803, or KBE-9007 manufactured by Sin-Etsu may be used, but the present application is not limited thereto.

In the crosslinkable composition, the silane coupling agent may be included at 0.01 to 5 or 0.01 to 1 part by weight with respect to 100 parts by weight of the block copolymer, and in this range, desired physical properties may be effectively provided to the crosslinked product.

The crosslinkable composition may further include a tackifier as needed. The tackifier may be, but is not limited to, a mixture of one or at least two of a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, and a polymerized rosin ester resin, which may be used alone or in combination of at least two thereof. The tackifier may be included in the crosslinkable composition at 100 parts by weight or less with respect to 100 parts by weight of the block copolymer.

The crosslinkable composition may further include at least one additive selected from a crosslinking stimulator, a labeling agent, an adhesion stimulator, an epoxy resin, a curing agent, a UV stabilizer, an antioxidant, a coloring agent, a reinforcing agent, a filler, a foaming agent, a surfactant and a plasticizer when needed.

The crosslinkable composition may also have coating viscosity of approximately 500 to 3,000 cP at 23° C. The term "coating viscosity" is a viscosity of the crosslinkable composition, that is, a coating solution when applied to a coating process to form a crosslinked product, and a viscosity in the state in which a coating solid content is maintained. The coating viscosity may be in the range of, for example, 500 to 2,500, 700 to 2,500, or 900 to 2,300 cP at 23° C. The crosslinkable composition including the block copolymer may have a high viscosity even when effectively coating with a high concentration of the coating solid content.

The crosslinkable composition may have a gel fraction after realizing the crosslinking structure of 80 wt %. The gel content may be calculated by General Formula 1.

$$\text{Gel content}(\%) = B/A \times 100 \quad \text{[General Formula 1]}$$

In General Formula 1, A is a mass of the crosslinkable composition having a crosslinking structure, and B is a dry mass of an insoluble content of the crosslinkable composition having the mass A obtained by being placed into a mesh having a size of 200 mesh and dipped in ethyl acetate at room temperature for 72 hours.

The workability, durability and reliability and reworkability may be excellently maintained by maintaining a gel content at 80 wt % or less. The lower limit of the gel content of the crosslinkable composition may be, but is not particularly limited to, for example, 0 wt %. However, the phrase "gel content is 0 wt %" does not mean that crosslinking does not progress at all in the crosslinkable composition. For example, in the crosslinkable composition having a gel content of 0 wt %, a crosslinkable composition in which no crosslinking is progressing or a crosslinking composition in which crosslinking progresses to some extent but a leak occurs since a gel is not maintained in a mesh having a size of 200 mesh due to a low crosslinking degree.

Such a crosslinkable composition may be used as, for example, a pressure-sensitive adhesive composition as described above. Other than this, the crosslinkable composition may be used for various uses including a filling agent.

In another aspect, a crosslinked product of the crosslinkable composition or a pressure-sensitive adhesive including the same is provided. The crosslinked product may be formed by a suitable crosslinking treatment to the crosslinkable composition, for example, application of heat or aging. As described above, such a crosslinked product may have a sphere structure as described above, and a hard domain and a crosslinkable functional group may serve as a physical or chemical crosslinking point.

As a representative use of the crosslinkable composition or a crosslinked product thereof, there is a pressure-sensitive adhesive composition or pressure-sensitive adhesive for an optical member. The composition or product for the optical member may be used to laminate various optical members or apply the optical member or a film thereof to a display device such as a liquid crystal panel. The optical member may be a polarizing plate, a polarizer, a protective film, an anti-reflective film, a retardation film, a wide viewing angle compensation film or a brightness enhancing film, but the present application is not limited thereto. The terms "polarizer and polarizing plate" used herein are different from each other. That is, the polarizer indicates a film, sheet or element having a polarizing function, and the polarizing plate is an optical element having another component in addition to the polarizer. As another component which can be included in the optical element in addition to the polarizer, a polarizer protective film or a retardation layer may be used, but the present application is not limited thereto.

In the present application, a method of forming the pressure-sensitive adhesive layer may be, but is not particularly limited to, for example, a method of realizing a crosslinking structure by directly coating with and curing the crosslinkable composition, or a method of forming a crosslinking structure by coating with and curing the crosslinkable composition and transferring the composition.

A method of coating with the pressure-sensitive adhesive composition may be, but is not particularly limited to, a method of coating with the crosslinkable composition using a conventional means such as a bar coater.

During the coating process, a multifunctional crosslinking agent included in the crosslinkable composition is preferably controlled to prevent a crosslinking reaction at a functional group in terms of a uniform coating process, and therefore, the crosslinking agent may form a crosslinking structure during curing and aging processes after coating to enhance a cohesive strength of a pressure-sensitive adhesive, a pressure-sensitive adhesive property and cuttability.

The coating process may also be performed after sufficiently removing a volatile component in the crosslinkable composition or a bubbling component such as a reaction residue, and therefore, a decrease in a modulus of elasticity due to excessively low crosslinking density or molecular weight of the crosslinked product and a scatterer that may be formed therein due to expanding bubbles between a glass plate and a pressure-sensitive adhesive layer at a high temperature may be prevented.

After the coating process, a method of implementing a crosslinking structure by curing the crosslinking composition may be, but is not particularly limited to, a method of maintaining a coating layer at a suitable temperature to induce a crosslinking structure of a block copolymer and a multifunctional crosslinking agent, which are included in the coating layer.

In yet another aspect, the present application provides a display device, for example, an LCD device. The display device may include the optical film or a polarizing plate described above.

For example, when the display device includes a display panel, the optical member described above may be attached to the display panel by means of the pressure-sensitive adhesive layer. When the display device is an LCD, the device may include a liquid crystal panel as the display panel, and the polarizing plate or optical film attached to one or both surfaces of the liquid crystal panel. The polarizing plate or optical film may be attached to the liquid crystal panel by a pressure-sensitive adhesive layer including the above-described crosslinked product. As the liquid crystal panel applied to the LCD, for example, a known panel such as a twisted nematic (TN)-mode, super twisted nematic (STN)-mode, ferroelectric (F)-mode, and polymer dispersed (PD)-mode panel; all types of active matrix panels including a two terminal-mode and three terminal-mode panel; an in-plane switching (IPS)-mode panel; and a vertically aligned (VA)-mode panel may be applied.

In addition, types of other components of the LCD device, for example, upper and lower substrates such as a color filter substrate or an array substrate are not particularly limited, either, and any components known in the art may be employed without limitation.

Effects

The present application can provide a pressure-sensitive adhesive layer including a polymer component, which can exhibit excellent crosslinking efficiency even at a low molecular weight, can have excellent workability, durability and dimension stability, and an optical film to which the pressure-sensitive adhesive layer is applied.

Embodiments

Hereinafter, a pressure-sensitive adhesive composition will be described in detail with reference to examples and comparative examples, but the scope of the pressure-sensitive adhesive composition is not limited to the following examples.

1. Measurement of Molecular Weight

A number average molecular weight (Mn) and a polydispersity index (PDI) were measured under the following conditions using GPC, and standard polystyrene produced by Agilent System was used to produce a calibration curve by which the measurement results were converted.

<Measurement Conditions>
Measuring Tool: Agilent GPC (Agilent 1200 series, U.S.)
Column: Two connected PL mixed B
Column Temperature: 40° C.
Eluent: Tetrahydrofuran (THF)
Flow Rate: 1.0 mL/min
Concentration: ~1 mg/mL (100 µl injection)

In addition, a change rate in molecular weight was calculated by evaluating a molecular weight (Mn, A) of a polymer solution before adding a crosslinking agent and a catalyst and a molecular weight (Mn, B) of a crosslinking reaction product after the crosslinking reaction according to the following equation.

<Evaluation of change rate of molecular weight>
Change rate (%) of molecular weight $=100\times(B-A)/A$ 2. Measurement of Gel Content A pressure-sensitive adhesive layer manufactured in the examples or comparative examples was maintained in a thermo-hygrostat (23° C., 60% relative humidity) for 10 days, and 0.3 g of the resulting layer was sampled, placed into a #200 stainless iron mesh, dipped in 100 ml of ethyl acetate to be completely immersed, and stored in a dark room at room temperature for 3 days. Afterward, a part not dissolved in ethyl acetate (insoluble content) was collected and dried at 70° C. for 4 hours to measure a weight (dry weight of the insoluble content).

Subsequently, the measurement results were substituted in the following Formula, and a gel content (unit: %) was determined.

[Equation for measuring gel content]

Gel content $=B/A\times100$

A: weight of pressure-sensitive adhesive (0.3 g)
B: dry weight of insoluble content (unit: g)

3. Calculation of Glass Transition Temperature

A glass transition temperature (Tg) was calculated by the following equation according to the composition of monomers of each block.

<Equation>

$1/Tg = \Sigma Wn/Tn$

In this equation, Wn is a weight fraction of each monomer of a polymer, Tn is a glass transition temperature exhibited when the monomer forms a homopolymer, and the right side of the equation is a result obtained by summation of all values (Wn/Tn) calculated by dividing a weight fraction of the used monomer by a glass transition temperature exhibited by the monomer when the monomer forms the homopolymer.

4. Method of Evaluating Durability

A sample was manufactured by cutting a pressure-sensitive adhesive polarizing plate manufactured in the examples or comparative examples to have a width of 320 mm and a length of 180 nm The manufactured sample was attached to a commercially-available LCD panel having a thickness of approximately 0 7 mm by means of a pressure-sensitive adhesive layer, and the panel to which the sample was attached was stored at 50° C. and under a pressure of 5 atm for approximately 20 minutes. The manufactured sample was maintained at 90° C. for 300 hours, and whether or not bubbles or delamination occurred at a pressure-sensitive adhesive interface of the pressure-sensitive adhesive layer was observed to evaluate durability according to the following criteria.

<Criteria for Evaluating Durability>
A: the case that bubbles or delamination was not observed.
B: the case that a small quantity of bubbles and/or delamination was observed.
C: the case that a great quantity of bubbles and/or delamination was observed.

PREPARATION EXAMPLE 1

Preparation of Block Copolymer (A)

200 g of methyl methacrylate (MMA), 200 g of ethyl acetate and 1.95 g of ethyl-2-bromoisobutyrate were placed into a flask, the flask was sealed, and nitrogen bubbling was performed for approximately 40 minutes to remove oxygen. After removal of oxygen, the flask was placed into an oil bath heated at 65° C., and 0.045 g of $CuBr_2$ and 0.116 g of tri(2-pyridylmethyl)amine (TPMA) were dissolved in 3 ml of N,N-dimethylformamide (DMF) in a 10 ml vial. Afterward, an ATRP catalyst solution from which oxygen was removed by nitrogen bubbling was placed into the flask. Subsequently, 1.62 g of tin(II) octoate (Sn(EH)$_2$) was input as a catalyst reducing agent to initiate a reaction. The flask was heated for approximately 7 hours, and opened to expose the resulting solution to oxygen to terminate a reaction, thereby preparing a macroinitiator (MI) having a monomer conversion rate of 68%, a molecular weight (Mn) of approximately 16,000, and a molecular weight distribution (Mw/Mn) of 1.24. 100 g of n-butyl acrylate (n-BA), 3 g of 4-hydroxybutyl acrylate (4-HBA) and 113 g of ethyl acetate were mixed with 10 g of the macroinitiator and placed into a flask, and nitrogen bubbling was performed for approximately 30 minutes to remove oxygen. A catalyst solution, in which 0.018 g of CuBr$_2$, 0.048 g of TPMA and 1.3 ml of DMF were mixed, was added at a reaction temperature of approximately 65° C. under a nitrogen atmosphere, and 0.067 g of Sn(EH)$_2$ was added to initiate a reaction. At the time in which a reaction conversion rate reached approximately 65%, approximately 6.3 g of a branch-forming monomer, acryloyloxybutyl a-bromoisobutyrate, from which oxygen was previously removed, was added, and reacted for approximately 15 hours until termination of the reaction, thereby preparing a block copolymer solution having a monomer conversion rate of 85%, a molecular weight (Mn) of 18,000, and a molecular weight distribution (Mw/Mn) of 6.65. Here, the conversion rate of the monomer was measured by a known method using gas chromatography (GC). The block copolymer included a first block including a polymerization unit of MMA and having a glass transition temperature of 110° C., and a block including polymerization units of n-BA and 4-HPA as main components, having a branched structure formed based on acryloyloxybutyl a-bromoisobutyrate, and having a glass transition temperature of approximately-45° C. In addition, here, a weight ratio of the first block and the second block was approximately 10:90.

PREPARATION EXAMPLE 2

Preparation of Block Copolymers (B)

100 g of n-BA, 3 g of 4-HBA, and 113 g of ethylacetate were mixed with 10 g of the macroinitiator prepared in Preparation Example 1, and placed into a flask, and nitrogen bubbling was performed for approximately 30 minutes to remove oxygen. A catalyst solution, in which 0.018 g of CuBr$_2$, 0.048 g of TPMA and 1.3 ml of DMF were mixed, was added at a reaction temperature of approximately 65° C. under a nitrogen atmosphere, and 0.067 g of Sn(EH)$_2$ was added to initiate a reaction. At the time in which a reaction conversion rate of reached approximately 65%, 0.94 g of a branch-forming monomer, divinyl benzene, from which oxygen was previously removed, was added, and reacted for approximately 15 hours until termination of the reaction, thereby preparing a block copolymer solution having a monomer conversion rate of 76%, a molecular weight (Mn) of 103,000, and a molecular weight distribution (Mw/Mn) of 3.29. The block copolymer included a first block including a polymerization unit of MMA and having a glass transition temperature of 110° C., and a block including polymerization units of n-BA and 4-HPA as main components, having a branched structure formed based on divinyl benzene, and having a glass transition temperature of approximately –45° C. In addition, here, a weight ratio of the first block and the second block was approx. 11:89.

PREPARATION EXAMPLE 3

Preparation of Block Vopolymer (C)

100 g of n-BA, 3 g of 4-HBA, and 113 g of ethylacetate were mixed with 10 g of the macroinitiator prepared in Preparation Example 1, and placed into a flask, and nitrogen bubbling was performed for approximately 30 minutes to remove oxygen. A catalyst solution, in which 0.018 g of CuBr$_2$, 0.048 g of TPMA and 1.3 ml of DMF were mixed, was added at a reaction temperature of approximately 65° C. under a nitrogen atmosphere, and 0.067 g of Sn(EH)$_2$ was added to initiate a reaction. The reaction was performed for approximately 15 hours and then terminated, thereby preparing a block copolymer having a monomer conversion rate of approximately 89%, a molecular weight (Mn) of 110,000, and a molecular weight distribution (Mw/Mn) of 1.43. The block copolymer included a first block including a polymerization unit of MMA and having a glass transition temperature of 110° C., and a block including polymerization units of n-BA and 4-HPA as main components, having no branched structure formed, and having a glass transition temperature of approximately –45° C. In addition, here, a weight ratio of the first block and the second block was approx. 10:90.

EXAMPLE 1

100 parts by weight of the block copolymer (A) prepared in Preparation Example 1 was mixed with approximately 0.3 parts by weight of a crosslinking agent toluene diisocyanate (TDI) and approximately 0.015 parts by weight of a known crosslinking catalyst, thereby preparing a crosslinkable composition. Subsequently, the composition was coated on a release-treated poly(ethylene terephthalate) (PET) film to have a thickness of approximately 25 um, and dried at 120 C for 3 minutes. Subsequently, the formed dry layer was transferred to one surface of the known polarizing plate, thereby manufacturing a pressure-sensitive adhesive polarizing plate.

EXAMPLE 2

A pressure-sensitive adhesive polarizing plate was manufactured by the same method as described in Example 1, except that a crosslinking composition was prepared by mixing approximately 0.3 parts by weight of a crosslinking agent (TDI) and approximately 0.015 parts by weight of a known crosslinking catalyst with 100 parts by weight of the block copolymer (B) prepared in Preparation Example 2.

EXAMPLE 3

A pressure-sensitive adhesive polarizing plate was manufactured by the same method as described in Example 1, except that a crosslinking composition was prepared by mixing approximately 0.15 parts by weight of a crosslinking agent (TDI) and approximately 0.075 parts by weight of a known crosslinking catalyst with 100 parts by weight of the block copolymer (B) prepared in Preparation Example 2.

COMPARATIVE EXAMPLE 1

A pressure-sensitive adhesive polarizing plate was manufactured by the same method as described in Example 1, except that a crosslinking composition was prepared by mixing approximately 0.3 parts by weight of a crosslinking agent (TDI) and approximately 0.015 parts by weight of a known crosslinking catalyst with 100 parts by weight of the block copolymer (C) prepared in Preparation Example 3

COMPARATIVE EXAMPLE 2

A pressure-sensitive adhesive polarizing plate was manufactured by the same method as described in Example 1, except that a crosslinking composition was prepared by mixing approximately 0.15 parts by weight of a crosslinking agent (TDI) and approximately 0.0075 parts by weight of a known crosslinking catalyst with 100 parts by weight of the block copolymer (C) prepared in Preparation Example 3.

Results of evaluating physical properties of the crosslinking compositions of the examples and comparative examples are summarized and listed in Table 1.

TABLE 1

| | | Example | | | Comparative Example | |
|---|---|---|---|---|---|---|
| | | 1 | 2 | 3 | 1 | 2 |
| | Durability | A | A | A | B | C |
| Curing efficiency | Gel content (%) | 12 | 66 | 26 | 3 | 0 |
| | Change rate of molecular weight (%) | 55 | 88 | 59 | 36 | 16 |

From the results of Table 1, it was confirmed that since a block copolymer including a second block having a branched structure (Examples 1 to 3) exhibited a high change rate of a molecular weight and a high gel content even when in a state in which a small amount of the crosslinking agent was applied, due to the branched structure and a phase separation characteristic of the block copolymer, excellent crosslinking efficiency was exhibited and thus durability was stably ensured. Meanwhile, when a block copolymer not having a branched structure is applied (Comparative Examples 1 and 2), since suitable crosslinking was not performed in the state in which a crosslinking agent was mixed at the same amount as that used in the examples, the gel content and the change rate of a molecular weight were decreased, and thus low durability was exhibited.

What is claimed is:

1. A pressure-sensitive adhesive optical film, comprising:
   an optical member; and
   a pressure-sensitive adhesive layer formed on at least one surface of the optical member,
   wherein the pressure-sensitive adhesive layer includes a crosslinked product of a crosslinkable composition including a block copolymer including a first block and a second block having a lower glass transition temperature than the first block, and a branched structure in either the first block or the second block.

2. The optical film according to claim 1, wherein the block copolymer in the pressure-sensitive adhesive layer is realized in at least one structure selected from the group consisting of a sphere structure, a cylinder structure, a gyroid structure and a lamella structure.

3. The optical film according to claim 1, wherein the glass transition temperature of the first block is in the range of 30 to 200° C.

4. The optical film according to claim 1, wherein the glass transition temperature of the second block is in the range of −80 to 0° C.

5. The optical film according to claim 1, wherein the block copolymer includes the first block in the range of 5 to 25 parts by weight and the second block in the range of 75 to 95 parts by weight.

6. The optical film according to claim 1, wherein the first block includes a polymerization unit of an alkyl methacrylate as a main component.

7. The optical film according to claim 1, wherein the second block includes a polymerization unit of an alkyl acrylate as a main component.

8. The optical film according to claim 1, wherein the first block or the second block formed in the branched structure includes a polymerization unit of a (meth)acrylic acid ester monomer and a polymerization unit of a branch-forming monomer.

9. The optical film according to claim 8, wherein the branch-forming monomer is represented by Formula 1:

[Formula 1]

where Y is an alkenyl group, an acryloyloxy group, a methacryloyloxy group, an acryloyloxyalkyl group, a methacryloyloxyalkyl group or a haloalkyl group, X is an n valent residue derived from a hydrocarbon group including or not including an oxygen atom, and n is a number in the range of 2 to 6.

10. The optical film according to claim 8, wherein the branch-forming monomer is represented by any one of Formulas 2 to 5:

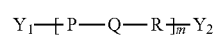
[Formula 2]

where $Y_1$ and $Y_2$ are each independently an alkenyl group, an acryloyloxy group, a methacryloyloxy group, an acryloyloxyalkyl group, a methacryloyloxyalkyl group or a haloalkyl group, P and R are each independently an alkylene group or a single bond, Q is an oxygen atom or a single bond, and m is a number in the range of 1 to 10, and

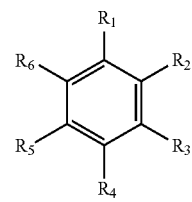
[Formula 3]

$R_1$ to $R_6$ are each independently a hydrogen atom, an alkyl group, an alkenyl group, an acryloyloxy group, a methacryloyloxy group, an acryloyloxyalkyl group, a methacryloyloxyalkyl group or a haloalkyl group, and at least two of $R_1$ to $R_6$ are an alkenyl group, an acryloyloxy group, a methacryloyloxy group, an acryloyloxyalkyl group, a methacryloyloxyalkyl group or a haloalkyl group,

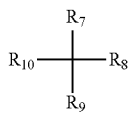

[Formula 4]

where $R_7$ and $R_{10}$ are each independently a hydrogen atom, an alkyl group, an alkenyl group, an acryloyloxy group, a methacryloyloxy group, an acryloyloxyalkyl group, a methacryloyloxyalkyl group or a haloalkyl group, and at least three of $R_7$ to $R_{10}$ are an alkenyl group, an acryloyloxy group, a methacryloyloxy group, an acryloyloxyalkyl group, a methacryloyloxyalkyl group or a haloalkyl group; and

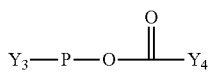

[Formula 5]

where $Y_3$ and $Y_4$ are each independently an alkenyl group, an acryloyloxy group, a methacryloyloxy group, an acryloyloxyalkyl group, a methacryloyloxyalkyl group or a haloalkyl group, and P is an alkylene group.

11. The optical film according to claim 8, wherein the first block or the second block formed in the branched structure includes 0.01 to 10 mol% of a branch-forming monomer based on a total number of moles of monomers included in the block.

12. The optical film according to claim 1, wherein the second block is formed in the branched structure.

13. The optical film according to claim 1, wherein the second block includes a crosslinkable functional group.

14. The optical film according to claim 1, wherein the second block includes a polymerization unit of an acrylic acid alkyl ester, a polymerization unit of a branch-forming monomer, and a polymerization unit of a copolymerizable monomer having a crosslinkable functional group.

15. The optical film according to claim 14, wherein a ratio of the number of moles of the second block includes a polymerization unit of an acrylic acid alkyl ester, a polymerization unit of a branch-forming monomer, and a polymerization unit of a copolymerizable monomer having a crosslinkable functional group with respect to a total number of moles of monomers included in the second block.

16. The optical film according to claim 1, wherein the crosslinkable composition further includes a crosslinking agent.

17. The optical film according to claim 1, wherein the optical member is a polarizer.

18. A crosslinkable composition, comprising:
a block copolymer including a first block and a second block having a lower glass transition temperature than the first block,
wherein the first block includes a polymerization unit of an alkyl methacrylate as a main component,
wherein the second block includes a polymerization unit of an alkyl acrylate as a main component, and
wherein a branched structure is formed in the second block, and
wherein the second block includes a polymerization unit of a branch-forming monomer represented by Formula 1 below:

[Formula 1]

wherein Formula 1, Y is an alkenyl group, an acryloyloxy group, a methacryloyloxy group, an acryloyloxyalkyl group, a methacryloyloxyalkyl group or a haloalkyl group, X is an n valent residue derived from a hydrocarbon group including or not including an oxygen atom, and n is a number in the range of 2 to 6,
wherein the second block further includes a polymerization unit of a monomer having a crosslinkable functional group, wherein the crosslinkable functional group is a hydroxyl group, a carboxyl group, an isocyanate group, or an amine group.

19. A display device, comprising:
the optical film of claim 1.

20. The device according to claim 19, which comprises a display panel, wherein the pressure-sensitive adhesive optical film is attached to the display panel by means of a pressure-sensitive adhesive layer.

* * * * *